US012577923B2

(12) United States Patent
Colebrooke

(10) Patent No.: US 12,577,923 B2
(45) Date of Patent: Mar. 17, 2026

(54) EXHAUST NOZZLE AND A METHOD OF OPERATING AN EXHAUST NOZZLE

(71) Applicant: ROLLS-ROYCE plc, London (GB)

(72) Inventor: Jack F Colebrooke, Bristol (GB)

(73) Assignee: ROLLS-ROYCE PLC, London (GB)

( * ) Notice: Subject to any disclaimer, the term of this patent is extended or adjusted under 35 U.S.C. 154(b) by 54 days.

(21) Appl. No.: 18/234,177

(22) Filed: Aug. 15, 2023

(65) Prior Publication Data

US 2024/0175408 A1 May 30, 2024

(30) Foreign Application Priority Data

Sep. 13, 2022 (GB) ..................................... 2213335

(51) Int. Cl.
*F02K 1/00* (2006.01)
*F02K 1/12* (2006.01)
*F02K 1/15* (2006.01)
*F02K 1/80* (2006.01)

(52) U.S. Cl.
CPC ............ *F02K 1/1207* (2013.01); *F02K 1/002* (2013.01); *F02K 1/15* (2013.01); *F02K 1/80* (2013.01); *F05D 2220/323* (2013.01); *F05D 2250/231* (2013.01); *F05D 2250/311* (2013.01)

(58) Field of Classification Search
None
See application file for complete search history.

(56) References Cited

U.S. PATENT DOCUMENTS

| | | | |
|---|---|---|---|
| 2,858,668 A | 11/1958 | Kelley et al. | |
| 3,025,666 A * | 3/1962 | Keen ........................ | F02K 1/123 |
| | | | 239/455 |
| 4,000,611 A * | 1/1977 | McCardle, Jr. ........... | F02K 1/06 |
| | | | 244/12.5 |

(Continued)

FOREIGN PATENT DOCUMENTS

| | | |
|---|---|---|
| EP | 0 281 264 A1 | 9/1988 |
| FR | 2 745 334 A1 | 8/1997 |

(Continued)

OTHER PUBLICATIONS

Feb. 9, 2024 Extended Search Report issued in European Patent Application No. 23191243.7.

(Continued)

*Primary Examiner* — Edwin Kang
(74) *Attorney, Agent, or Firm* — OLIFF PLC

(57) ABSTRACT

An exhaust nozzle for a gas turbine engine includes: an exhaust duct configured to receive an exhaust flow of gas from a combustor of the engine; a first flap rotatably coupled to the exhaust duct for rotation about a first axis; a first actuator configured to actuate the first flap about the first axis between a first inner and a first outer position; a second flap rotatably coupled to the exhaust duct for rotation about a second axis; and a second actuator configured to actuate the second flap about the second axis between a second inner and a second outer position. The first and second flaps at least in part define a passageway configured to convey the exhaust flow of gas to an exterior of the gas turbine engine. The first and second axes of rotation are coaxial. Also provides is a method of operating an exhaust nozzle.

13 Claims, 14 Drawing Sheets

(56) References Cited

U.S. PATENT DOCUMENTS

| | | | | |
|---|---|---|---|---|
| 4,778,109 | A | * | 10/1988 | Jourdain ................. F02K 1/006 |
| | | | | 244/110 B |
| 4,836,451 | A | | 6/1989 | Herrick et al. |
| 4,993,641 | A | | 2/1991 | Kehret et al. |
| 5,076,496 | A | * | 12/1991 | Lippmeier .............. F02K 1/805 |
| | | | | 239/265.41 |
| 5,094,070 | A | | 3/1992 | Enderle |
| 5,201,800 | A | * | 4/1993 | Wolf ......................... F02K 1/15 |
| | | | | 239/265.19 |
| 5,694,766 | A | * | 12/1997 | Smereczniak ............ F02K 1/06 |
| | | | | 239/265.17 |
| 6,109,021 | A | * | 8/2000 | Hanley ................... F02K 1/008 |
| | | | | 91/171 |
| 6,276,126 | B1 | * | 8/2001 | Bouiller .................. F02K 1/008 |
| | | | | 239/265.41 |
| 6,385,965 | B1 | | 5/2002 | Abbe et al. |
| 6,871,797 | B2 | | 3/2005 | Peters |
| 6,910,328 | B1 | | 6/2005 | Joyce |
| 2009/0090817 | A1 | | 4/2009 | Monka |
| 2013/0017065 | A1 | * | 1/2013 | Webster ................ F02K 1/1207 |
| | | | | 415/148 |
| 2014/0165575 | A1 | * | 6/2014 | Izquierdo ............. F02K 1/1207 |
| | | | | 60/722 |
| 2015/0122905 | A1 | | 5/2015 | Martin et al. |
| 2016/0326982 | A1 | | 11/2016 | Pesyna |
| 2018/0171931 | A1 | * | 6/2018 | Watson ................. F02K 1/1246 |
| 2018/0245540 | A1 | | 8/2018 | Todorovic |

FOREIGN PATENT DOCUMENTS

| | | |
|---|---|---|
| GB | 850508 A | 10/1960 |
| GB | 2 437 418 A | 10/2007 |

OTHER PUBLICATIONS

Feb. 9, 2024 Extended Search Report issued in European Patent Application No. 23191242.9.

Apr. 10, 2024 U.S. Office Action issued in U.S. Appl. No. 18/234,148.

Jan. 24, 2023 Combined Search and Examination Report issued in British Patent Application No. 2213334.2.

Jan. 24, 2023 Combined Search and Examination Report issued in British Patent Application No. 2213335.9.

U.S. Appl. No. 18/234,148, filed Aug. 15, 2023 in the name of Jack F Colebrooke.

Jul. 9, 2024 Office Action issued in U.S. Appl. No. 18/234,148.

* cited by examiner

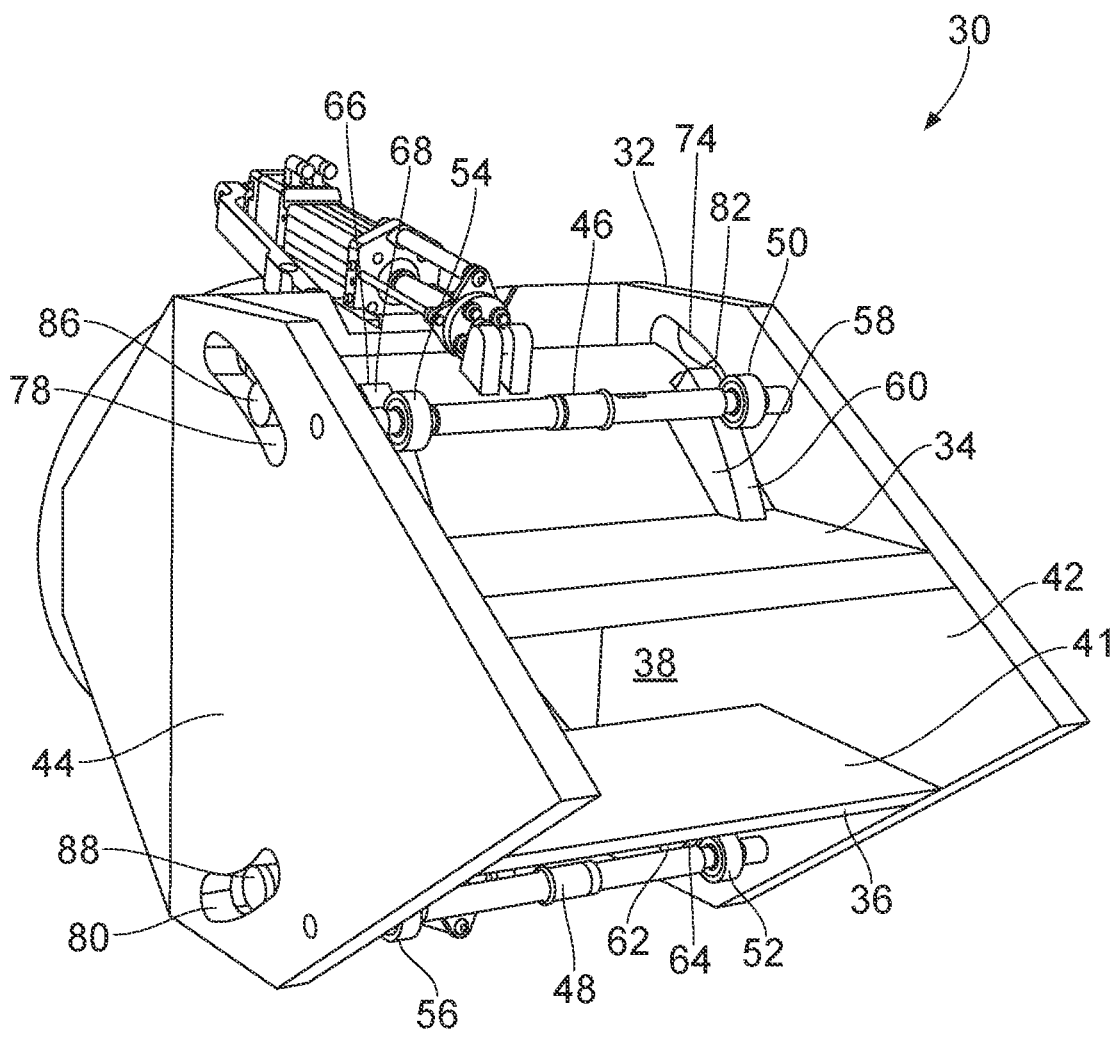
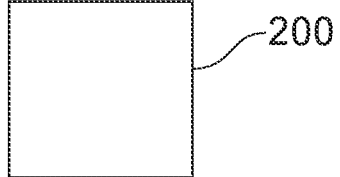
FIG. 2

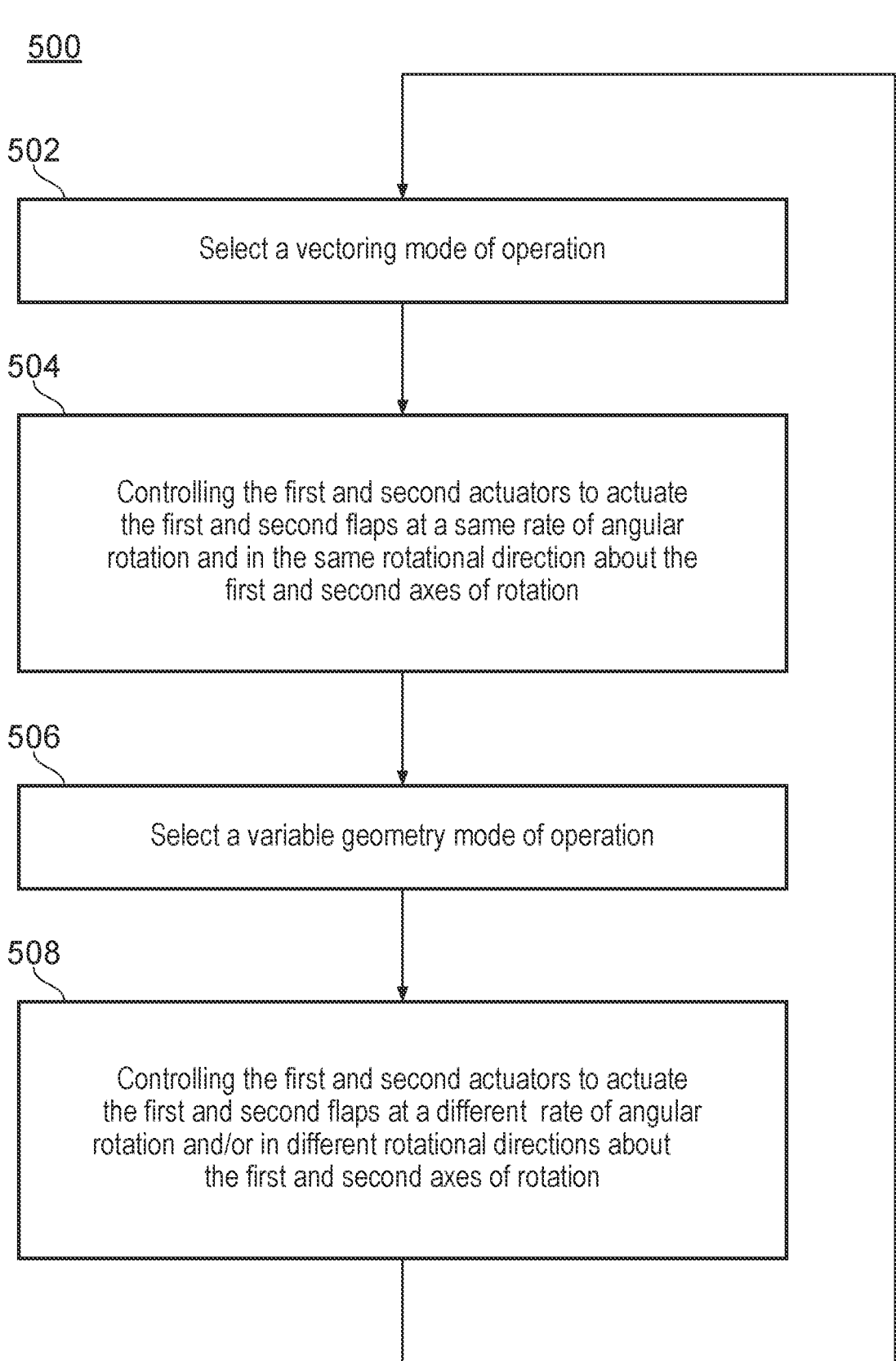

500

502
Select a vectoring mode of operation

504
Controlling the first and second actuators to actuate
the first and second flaps at a same rate of angular
rotation and in the same rotational direction about the
first and second axes of rotation 506
Select a variable geometry mode of operation 508
Controlling the first and second actuators to actuate
the first and second flaps at a different rate of angular
rotation and/or in different rotational directions about
the first and second axes of rotation

FIG. 12

EXHAUST NOZZLE AND A METHOD OF OPERATING AN EXHAUST NOZZLE

This disclosure claims the benefit of UK Patent Application No. GB 2213335.9, filed on 13 Sep. 2022, which is hereby incorporated herein in its entirety.

FIELD OF THE INVENTION

The present disclosure relates to an exhaust nozzle and a method of operating an exhaust nozzle.

BACKGROUND

It is known for gas turbine engines to have variable geometry exhaust nozzles. Such variable geometry exhaust nozzles comprise exhaust flaps that may be individually controlled to vary the exit area of the exhaust nozzle. Variable geometry exhaust nozzles may be used to maximise the production of thrust at high nozzle pressure ratios and to provide thrust vectoring. Thrust vectoring may also be provided by independently controlling the exhaust flaps. In such arrangements, when opposing exhaust flaps are moved synchronously, there is a change in the exit area of the gas turbine engine which may be undesirable. When opposing exhaust flaps are moved asynchronously, both the exit area of the gas turbine engine and the thrust vector are changed, resulting in thrust loss or an unintended vector.

It is therefore desirable to provide an improved exhaust nozzle and method of operating an exhaust nozzle that overcomes some or all of these issues.

SUMMARY OF THE INVENTION

According to a first aspect of the present disclosure, there is described an exhaust nozzle for a gas turbine engine, the exhaust nozzle comprising: an exhaust duct configured to receive an exhaust flow of gas from a combustor of the gas turbine engine; a first flap rotatably coupled to the exhaust duct for rotation about a first axis of rotation; a first actuator configured to actuate the first flap about the first axis of rotation between a first inner position and a first outer position; a second flap rotatably coupled to the exhaust duct for rotation about a second axis of rotation; and a second actuator configured to actuate the second flap about the second axis of rotation between a second inner position and a second outer position. The first and second flaps at least in part define a passageway configured to convey the exhaust flow of gas to an exterior of the gas turbine engine. The first and second axes of rotation are coaxial.

The exhaust nozzle may further comprise a first roller rotatably coupled to the exhaust duct and the first flap may comprise a first bearing surface configured to bear against the first roller during rotational movement of the first flap about the first axis of rotation. The first bearing surface may form part of a first cylindrical surface having a central axis that is coaxial with the first and second axes of rotation. The exhaust nozzle may further comprise a second roller rotatably coupled to the exhaust duct and the second flap may comprise a second bearing surface configured to bear against the second roller during rotational movement of the second flap about the second axis of rotation. The second bearing surface may form part of a second cylindrical surface having a central axis that is coaxial with the first and second axes of rotation.

The radius of the first cylindrical surface may be equal to the radius of the second cylindrical surface.

The exhaust duct may comprise a first side wall and a second side wall. The exhaust nozzle may further comprise a first shaft extending between the first side wall and the second side wall that rotatably supports the first roller. The exhaust nozzle may further comprise a second shaft extending between the first side wall and the second side wall that rotatably supports the second roller.

The first flap may comprise a first pin and the exhaust duct may comprise a first slot configured to slidably receive the first pin. A centreline of the first slot may extend part way along a first arc having a centre that is coincident with the first and second axes of rotation. The second flap may comprise a second pin and the exhaust duct may comprise a second slot configured to slidably receive the second pin. A centreline of the second slot may extend part way along a second arc having a centre that is coincident with the first and second axes of rotation.

The radius of the first arc may be equal to the radius of the second arc.

The first pin and the first roller may be circumferentially separated with respect to the first axis of rotation. The second pin and the second roller may be circumferentially separated with respect to the second axis of rotation.

The first flap may comprise a third pin and the exhaust duct may comprise a third slot configured to slidably receive the third pin. A centreline of the third slot may extend part way along a third arc having a centre that is coincident with the first and second axes of rotation. The second flap may comprise a fourth pin and the exhaust duct may comprise a fourth slot configured to slidably receive the fourth pin. A centreline of the fourth slot may extend part way along a fourth arc having a centre that is coincident with the first and second axes of rotation. The third and fourth slots and the third and fourth pins may be disposed radially outward of the first and second slots and the first and second pins with respect to the first and second axes of rotation.

The first flap may comprise a first control surface that in part defines the passageway. The second flap may comprise a second control surface that in part defines the passageway. The first control surface and the second control surface may be reflections of each other.

The first flap and the second flap may be convergent-divergent flaps. The first flap and the second flap may define a convergent-divergent nozzle.

The first flap and the second flap may be convergent flaps. The first flap and the second flap may define a convergent nozzle.

There may be provided a system comprising an exhaust nozzle as stated in any preceding statement and a controller. The controller may be configured to, in a vectoring mode of operation, control the first and second actuators to actuate the first and second flaps at a same rate of angular rotation and in the same rotational direction about the first and second axes of rotation.

The controller may be configured to, in a variable geometry mode of operation, control the first and second actuators to actuate the first and second flaps at different rates of angular rotation and/or in different rotational directions about the first and second axes of rotation.

There may be provided a gas turbine engine comprising an exhaust nozzle stated in any preceding statement or comprising a system as stated in any preceding statement.

According to a second aspect of the present disclosure, there is described a method of operating an exhaust nozzle as stated in any preceding statement, a system as stated in any preceding statement or a gas turbine engine as stated in any preceding statement, wherein the method comprises, in a vectoring mode of operation, controlling the first and second actuators to actuate the first and second flaps at a same rate of angular rotation and in the same rotational direction about the first and second axes of rotation.

The method may comprise, in a variable geometry mode of operation, controlling the first and second actuators to actuate the first and second flaps at different rates of angular rotation and/or in different rotational directions about the first and second axes of rotation.

LIST OF FIGURES

For a better understanding of the present invention, and to show more clearly how it may be carried into effect, reference will now be made, by way of example, to the accompanying drawings, in which:

FIG. 2 is a perspective view of the exhaust nozzle in isolation;

FIG. 12 is a flowchart of a method of operating the exhaust nozzle;

DETAILED DESCRIPTION

Figure 1:
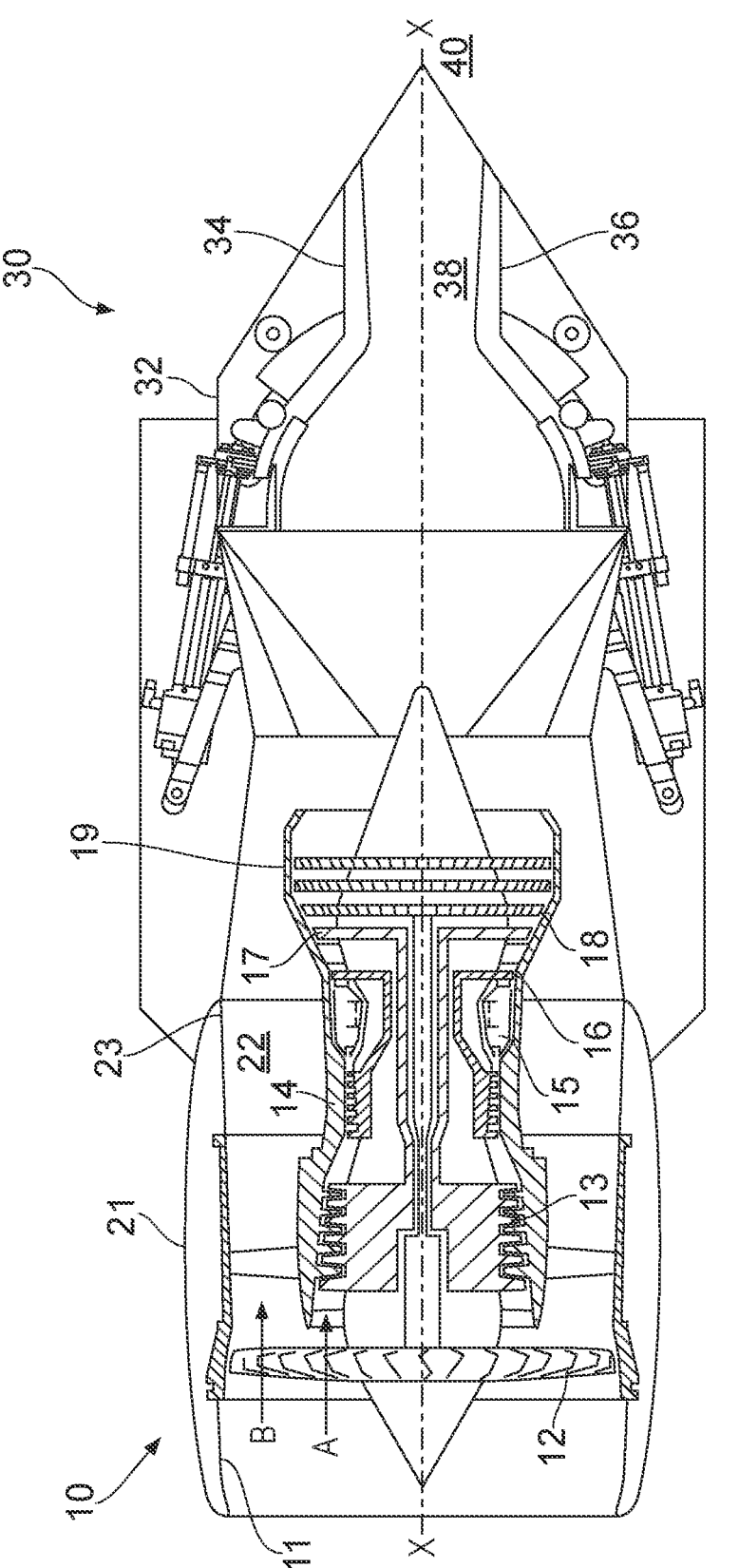
FIG. 1 is a cross-sectional view of an example gas turbine engine and an exhaust nozzle.

FIG. 1 shows a ducted fan gas turbine engine 10 having a principal and rotational axis X-X. The engine comprises, in axial flow series, an air intake 11, a propulsive fan 12, an intermediate pressure compressor 13, a high-pressure compressor 14, a combustor 15, a high-pressure turbine 16, an intermediate pressure turbine 17, a low-pressure turbine 18 and a core engine exhaust nozzle 19. A nacelle 21 generally surrounds the gas turbine engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustor 15 where it is mixed with fuel and the mixture combusted. The resultant hot combustion products then expand through, and thereby drive the high, intermediate and low-pressure turbines 16, 17, 18 before being exhausted through the core engine exhaust nozzle 19 to provide additional propulsive thrust. The high, intermediate and low-pressure turbines respectively drive the high and intermediate pressure compressors 14, 13 and the fan 12 by suitable interconnecting shafts.

The gas turbine engine 10 further comprises an exhaust nozzle 30. The exhaust nozzle 30 is disposed at a rear end of the gas turbine engine 10 and generally comprises an exhaust duct 32, a first flap 34 (also referred to as a petal) and a second flap 36. The exhaust duct 32 is configured to receive an exhaust flow of gas from the combustor 15. The first and second flaps 34, 36 in part define a passageway 38 configured to convey the exhaust flow of gas to an exterior 40 of the gas turbine engine 10.

Figure 3:
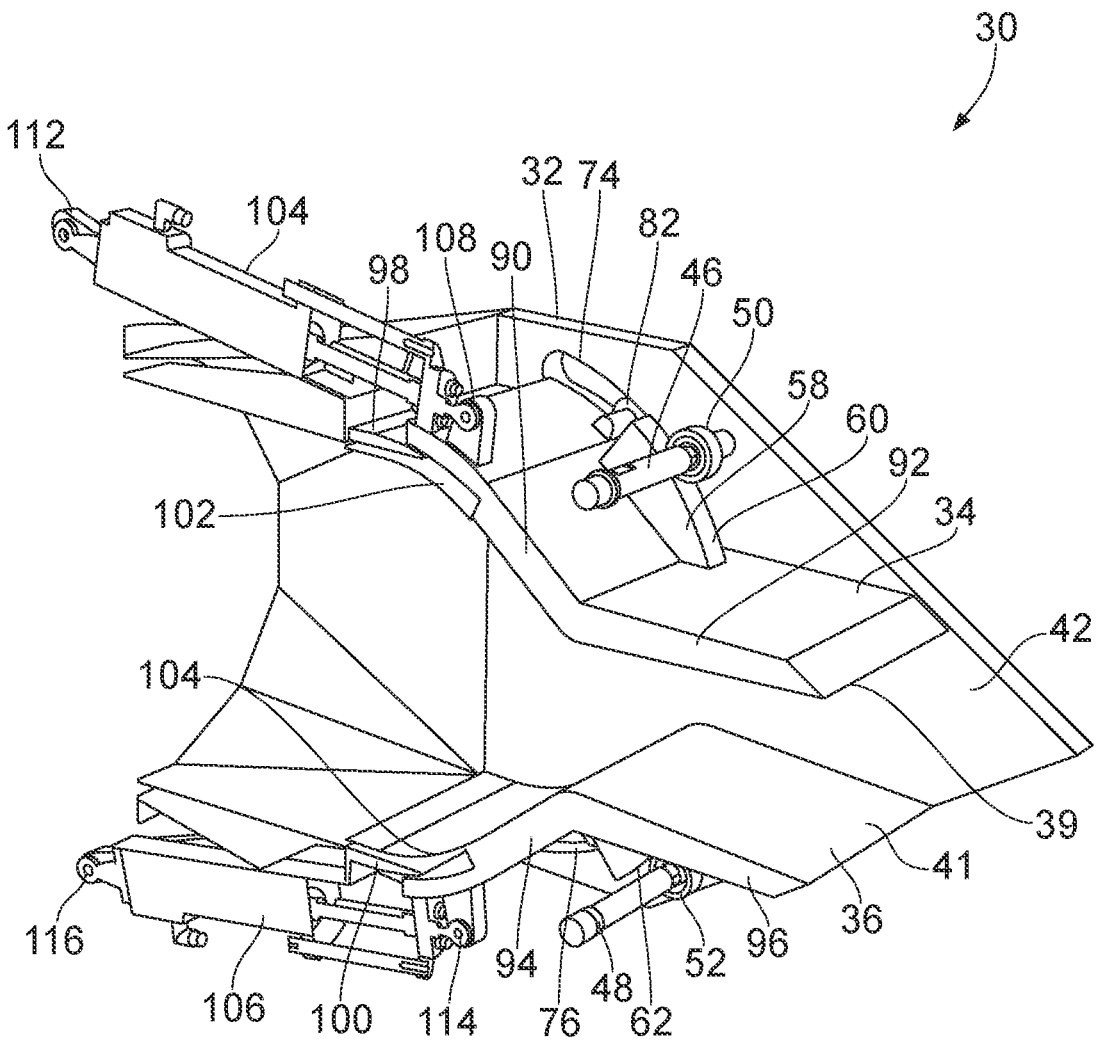
FIG. 3 is a perspective cross-sectional view of the exhaust nozzle.

FIG. 2 is a perspective view of the exhaust nozzle 30 in isolation and FIG. 3 is a perspective cross-sectional view of the exhaust nozzle 30 in isolation. As shown, the exhaust duct 32 comprises a first side wall 42 and a second side wall 44. The first and second side walls 42, 44 are spaced apart from each other. The first flap 34 is disposed between the first and second side walls 42, 44 in an upper portion of the exhaust nozzle 30. The second flap 36 is disposed between the first and second side walls 42, 44 in a lower portion of the exhaust nozzle 30. The first and second flaps 34, 36 seal against the first and second side walls 42, 44 by means of a conformal controlled gap. The first flap 34 comprises a first control surface 39 and the second flap 36 comprises a second control surface 41. The first control surface 39 and the second control surface 41 in part define (along with the first and second side walls 42, 44) the passageway 38. The first and second control surfaces 39, 41 are geometrically similar and are reflections of each other.

A first shaft or tiebar 46 extends between the first and second side walls 42, 44 in an upper portion of the exhaust nozzle 30. A second shaft or tiebar 48 extends between the first and second side walls 42, 44 in a lower portion of the exhaust nozzle 30. A first roller 50 is rotatably supported by the first shaft 46 and a second roller 52 is rotatably supported by the second shaft 48. In addition, a third roller 54 is rotatably supported by the first shaft 46 and a fourth roller 56 is rotatably supported by the second shaft 48. The first flap 34 comprises a first cam track or flange 58 that defines a first bearing surface 60. The second flap 36 comprises a second cam track or flange 62 that defines a second bearing surface 64. The first flap 34 further comprises a third cam track 66 that defines a third bearing surface 68. The second flap 36 further comprises a fourth cam track that defines a fourth bearing surface. The fourth cam track and bearing surface are hidden from view behind the second side wall 44 in FIG. 2 but are located on the second flap 36 in corresponding positions to the third cam track 66 and third bearing surface 68.

The first side wall 42 comprises a first slot 74 in an upper portion of the exhaust nozzle 30. The first side wall 42 further comprises a second slot 76 in a lower portion of the exhaust nozzle 30. The second side wall 44 comprises a third slot 78 in an upper portion of the exhaust nozzle 30. The second side wall 44 further comprises a fourth slot 80 in a lower portion of the exhaust nozzle 30. The first flap 34 comprises a first pin 82 that is slidably received by the first slot 74. The second flap 36 comprises a second pin 84 (not shown in FIG. 2 or 3) that is slidably received by the second slot 76. The first flap 34 further comprises a third pin 86 that is slidably received by the third slot 78. The second flap 36 further comprises a fourth pin 88 that is slidably received by the fourth slot 80.

The first flap 34 comprises a convergent portion 90 and a divergent portion 92. Accordingly, the first flap 34 is a convergent-divergent flap. Likewise, the second flap 36 comprises a convergent portion 94 and a divergent portion 96. Accordingly, the second flap 36 is also a convergent-divergent flap. The first and second flaps 34, 36 therefore define a convergent-divergent nozzle. The exhaust duct 32 comprises a first sealing flange 98 in an upper portion of the exhaust nozzle 30 and a second sealing flange 100 in a lower portion of the exhaust nozzle 30. A distal end of the convergent portion 94 of the first flap 34 comprises a channel 102 that slidingly receives the first sealing flange 98. A seal is formed between the first sealing flange 98 and the channel 102 of the first flap 34. A distal end of the convergent portion 94 of the second flap 36 comprises a channel 104 that slidingly receives the second sealing flange 100. A seal is formed between the second sealing flange 100 and the channel 102 of the second flap 36.

The exhaust nozzle 30 comprises a first actuator 104 and a second actuator 106. The convergent portion 90 of the first flap 34 comprises a first projection 108. A first end of a first actuator 104 is pivotally coupled to the first projection 108 at a first pivot. A second end of a first actuator 104 is pivotally coupled to the exhaust duct 32 at a second pivot 112. The convergent portion 90 of the second flap 36 comprises a second projection 114. A first end of a second actuator 106 is pivotally coupled to the second projection 114 at a third pivot. A second end of a second actuator 106 is pivotally coupled to the exhaust duct 32 at a fourth pivot 116.

Figure 4:
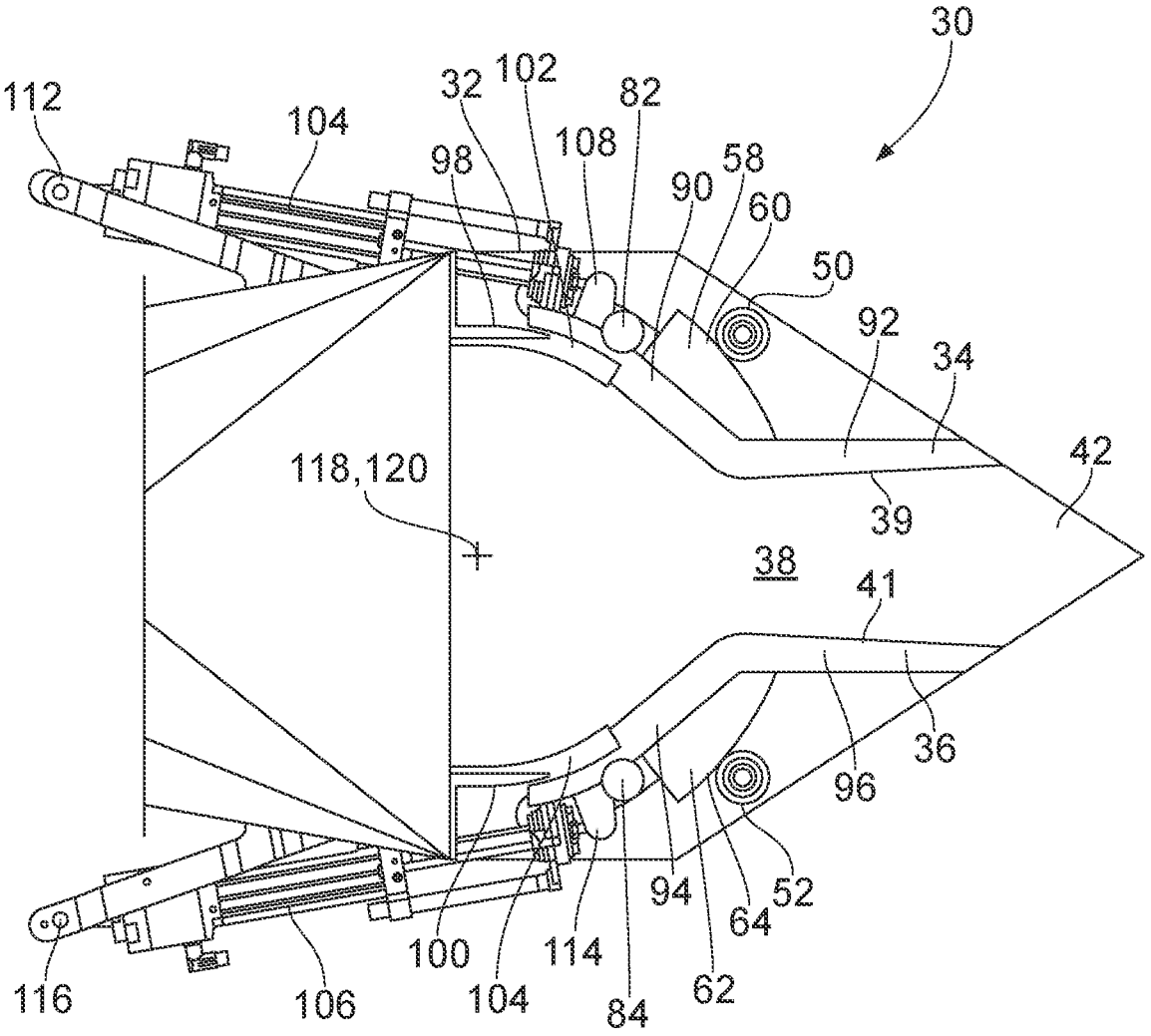
FIG. 4 is a cross-sectional side view of the exhaust nozzle in a first configuration.

FIG. 4 is a cross-sectional side view of the exhaust nozzle 30 in a first configuration in which the engine is operating dry. As described in further detail below, the first flap 34 is rotatably coupled to the exhaust duct 32 for rotation about a first axis of rotation 118 and the second flap 36 is rotatably coupled to the exhaust duct 32 for rotation about a second axis of rotation 120 that is coaxial (i.e. aligned) with the first axis of rotation 118. The first and second axes of rotation 118, 120 are defined so as to give the optimal expansion ratio between the throat and exit of the exhaust nozzle 30.

Figure 5:
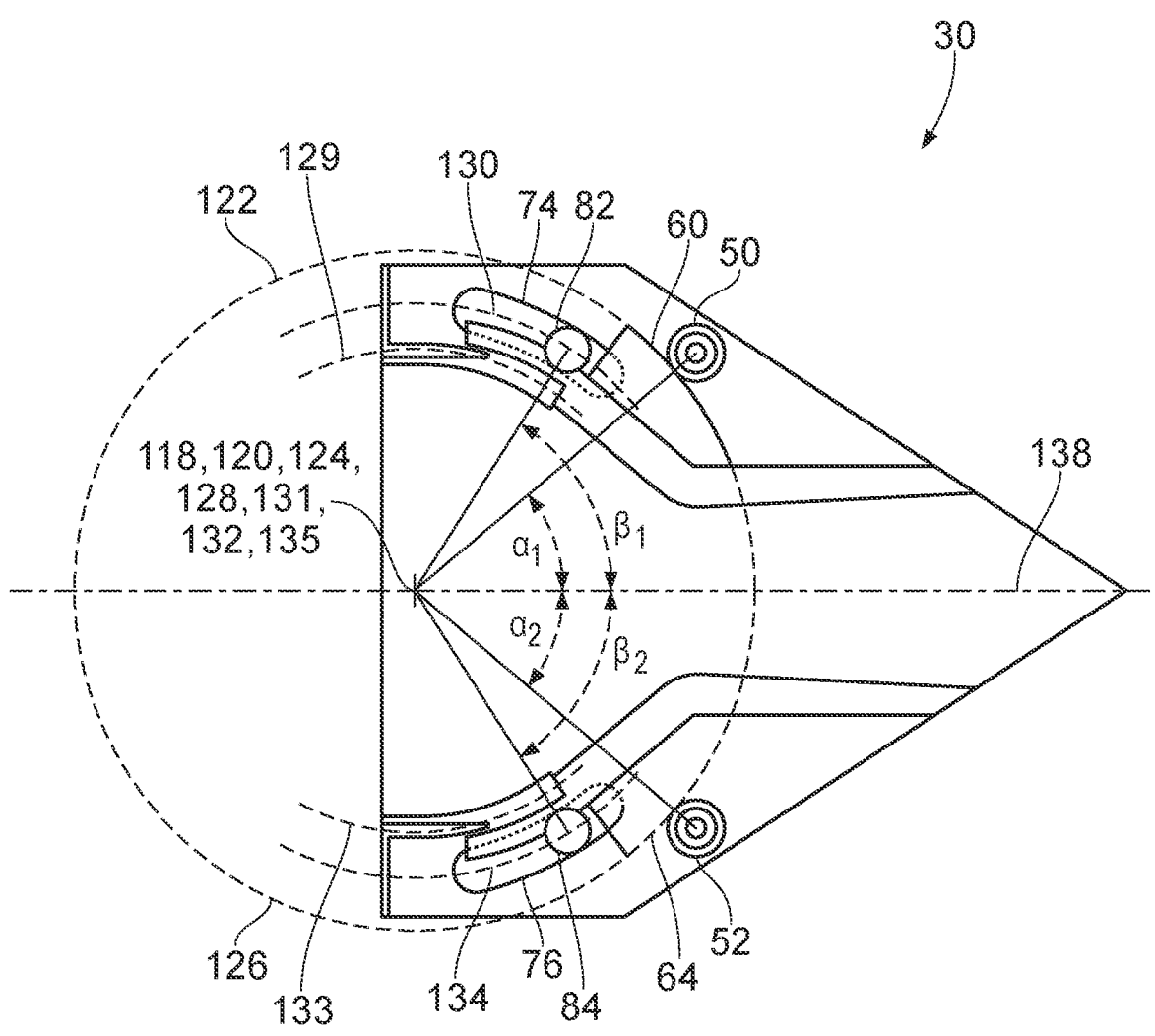
FIG. 5 is a further cross-sectional side view of the exhaust nozzle in a first configuration.

FIG. 5 is a simplified cross-sectional side view of the exhaust nozzle 30 in the first configuration. In the simplified view, certain components of the exhaust nozzle 30 are not shown so as to demonstrate certain geometric properties of the exhaust nozzle 30. In the view shown in FIG. 5, the first and second slots 74, 76 are partly hidden from view behind the first and second flaps 34, 36, respectively. Portions of the first and second slots 74, 76 that are hidden from view behind the first and second flaps 34, 36 are represented using dashed lines. The outer diameter of the first pin 82 is equal to the radial width of the first slot 74. Likewise, the outer diameter of the second pin 84 is equal to the radial width of the second slot 76.

As shown in FIG. 5, the first bearing surface 60 forms part of a first cylindrical surface 122 having a central axis 124 that is coaxial with the first and second axes of rotation 118, 120. The second bearing surface 64 forms part of a second cylindrical surface 126 having a central axis 128 that is coaxial with the first and second axes of rotation 118, 120. The radius of the first cylindrical surface 122 is equal to the radius of the second cylindrical surface 126. Accordingly, the first and second cylindrical surfaces 122, 126 are coincident. A centreline of the first slot 74 extends part way along a first arc 130 having a centre 132 that is coincident with the first and second axes of rotation 118, 120. A centreline of the second slot 76 extends part way along a second arc 134 having a centre 136 that is coincident with the first and second axes of rotation 118, 120. The radius of the first arc 130 is equal to the radius of the second arc 134. Accordingly, the first and second arcs 130, 134 lie on a single circle. A centreline of the channel 102 extends part way along a third arc 129 having a centre 131 that is coincident with the first and second axes of rotation 118, 120. A centreline of the channel 104 extends part way along a fourth arc 133 having a centre 135 that is coincident with the first and second axes of rotation 118, 120. The radius of the third arc 129 is equal to the radius of the fourth arc 133. Accordingly, the third and fourth arcs 129, 133 lie on a single circle.

The angle $\alpha_1$ between a central axis 138 of the exhaust nozzle 30 and a line extending through the first axis of rotation 118 and the first roller 50 is less than the angle $\beta_1$ between the central axis 138 and a line extending through the first axis of rotation 118 and the first pin 82. Accordingly, the first pin 82 and the first roller 50 are circumferentially separated with respect to the first axis of rotation 118. The angle $\alpha_2$ between the central axis 138 and a line 138 extending through the second axis of rotation 120 and the second roller 52 is less than the angle $\beta_2$ between the central axis 138 and a line extending through the second axis of rotation 120 and the second pin 84. Accordingly, the second pin 84 and the second roller 52 are circumferentially separated with respect to the second axis of rotation 120. The central axis 138 may correspond to a centreline of the exhaust nozzle 30, which may be aligned with the principal and rotational axis X-X of the gas turbine engine 10.

During operation of the exhaust nozzle 30, the first actuator 104 is able to actuate the first flap 34 about the first axis of rotation 118 between a first inner position and a first outer position. It will be appreciated that the first inner position need not be the innermost position that the first flap 34 is able to be actuated to and the first outer position need not be the outermost position that the first flap 34 is able to be actuated to. During actuation of the first flap 34, the first pin 82 slides along the first slot 74 and the first bearing surface 60 bears against the first roller 50. The first roller 50 constrains the motion of the first flap 34 and prevents it being displaced too far outwards under the pressure of the gas exiting the exhaust nozzle 30.

During operation of the exhaust nozzle 30, the second actuator 106 is able to actuate the second flap 36 about the second axis of rotation 120 between a second inner position and a second outer position. It will be appreciated that the second inner position need not be the innermost position that the second flap 36 is able to be actuated to and the second outer position need not be the outermost position that the second flap 36 is able to be actuated to. During actuation of the second flap 36, the second pin 84 slides along the second slot 76 and the second bearing surface 64 bears against the second roller 52. The second roller 52 constrains the motion of the second flap 36 and prevents it being displaced too far outwards under the pressure of the gas exiting the exhaust nozzle 30.

The first and second flaps 34, 36 can be actuated to the positions shown in FIGS. 4 and 5 in the first configuration. Examples of various additional combinations of positions that the first and second flaps 34, 36 can be actuated to in other configurations are described below with reference to FIGS. 6 to 11.

Figure 6:
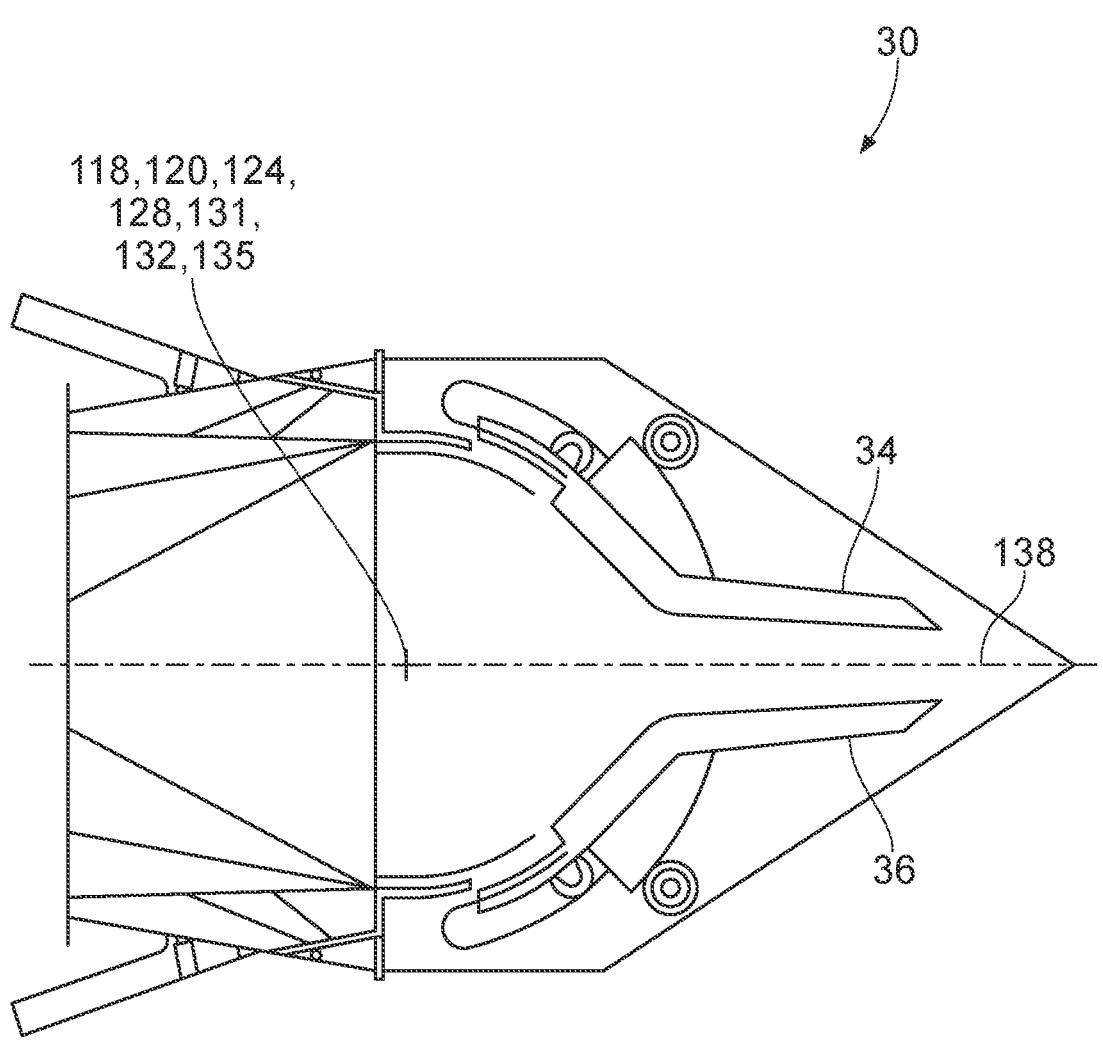
FIG. 6 is a cross-sectional side view of the exhaust nozzle in a second configuration.

FIG. 6 is a cross-sectional side view of the exhaust nozzle 30 in a second configuration. In the second configuration, the first flap 34 is positioned at a first inner position in which the first flap 34 is positioned relatively close to the centreline of the passageway 38 and the second flap 36 is positioned at a second inner position in which the second flap 36 is positioned relatively close to the centreline of the passageway 38.

Figure 7:
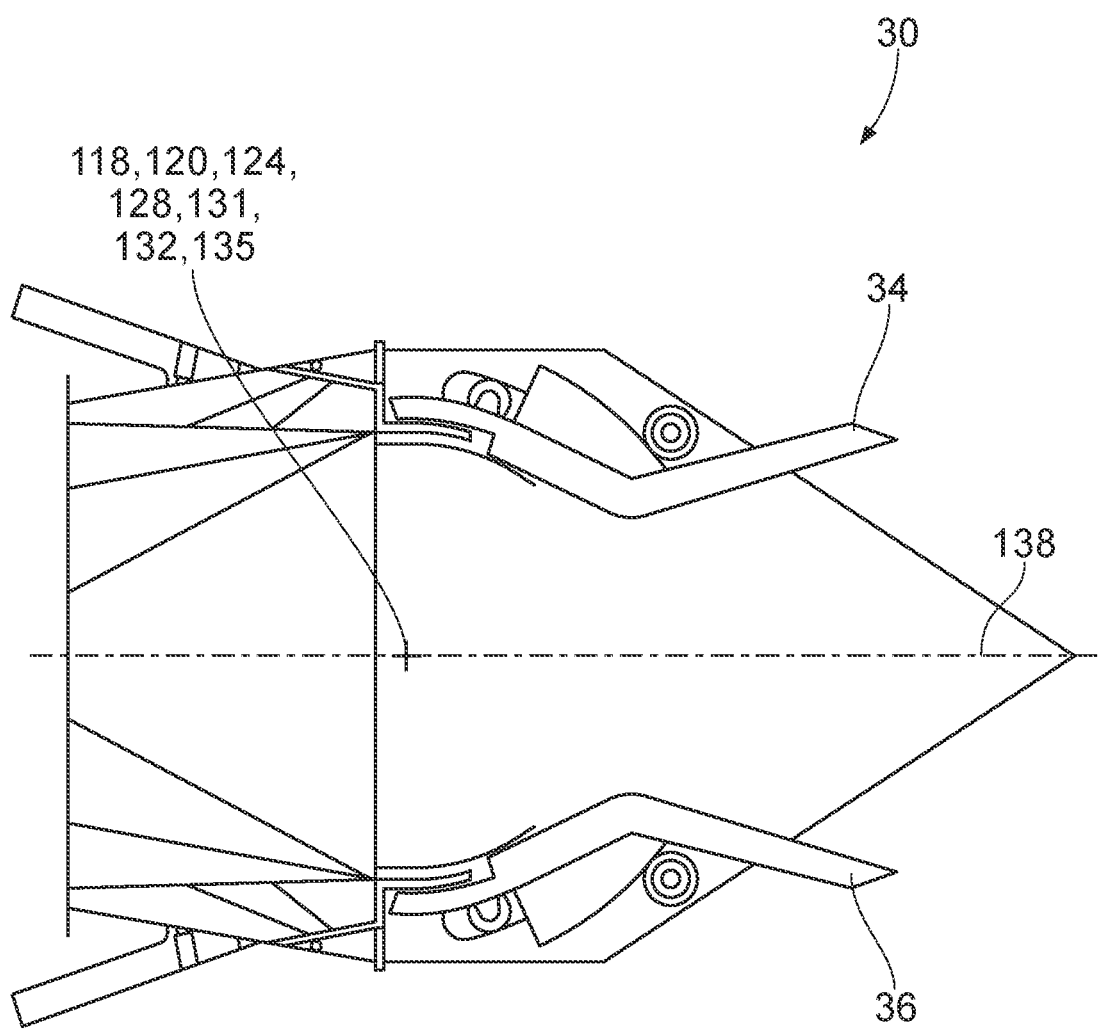
FIG. 7 is a cross-sectional side view of the exhaust nozzle in a third configuration.

FIG. 7 is a cross-sectional side view of the exhaust nozzle 30 in a third configuration. In the third configuration, the first flap 34 is positioned at a first outer position in which the first flap 34 is positioned relatively far away from the centreline of the passageway 38 and the second flap 36 is positioned at a second outer position in which the second flap 36 is positioned relatively far away from the centreline of the passageway 38.

Figure 8:
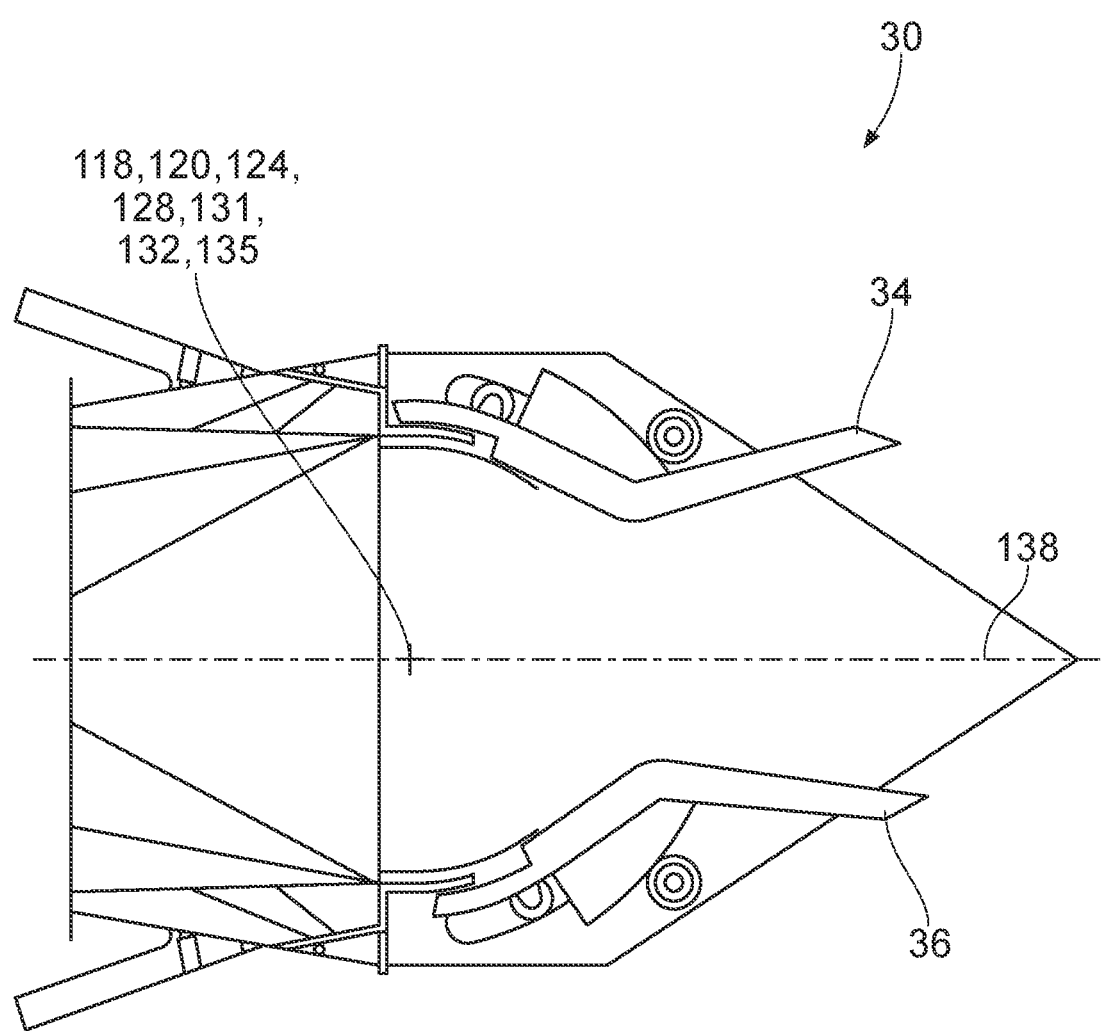
FIG. 8 is a cross-sectional side view of the exhaust nozzle in a fourth configuration.

FIG. 8 is a cross-sectional side view of the exhaust nozzle 30 in a fourth configuration. In the fourth configuration, the first flap 34 is positioned at the first outer position and the second flap 36 is positioned at an inner intermediate position between the second inner position and the second outer position.

Figure 9:
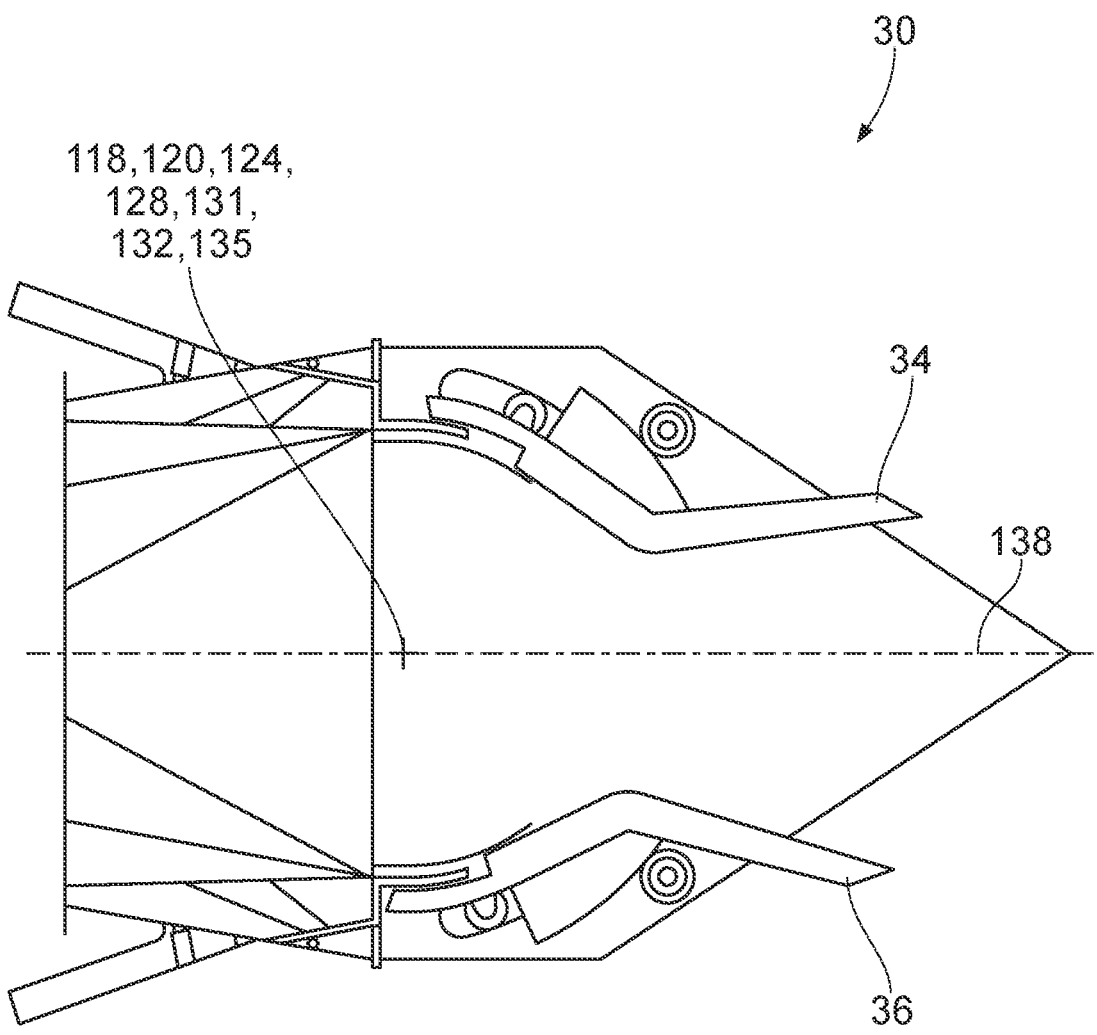
FIG. 9 is a cross-sectional side view of the exhaust nozzle in a fifth configuration.

FIG. 9 is a cross-sectional side view of the exhaust nozzle 30 in a fifth configuration. In the fifth configuration, the first flap 34 is positioned at an inner intermediate position between the first inner position and the first outer position and the second flap 36 is positioned at the second outer position.

Figure 10:
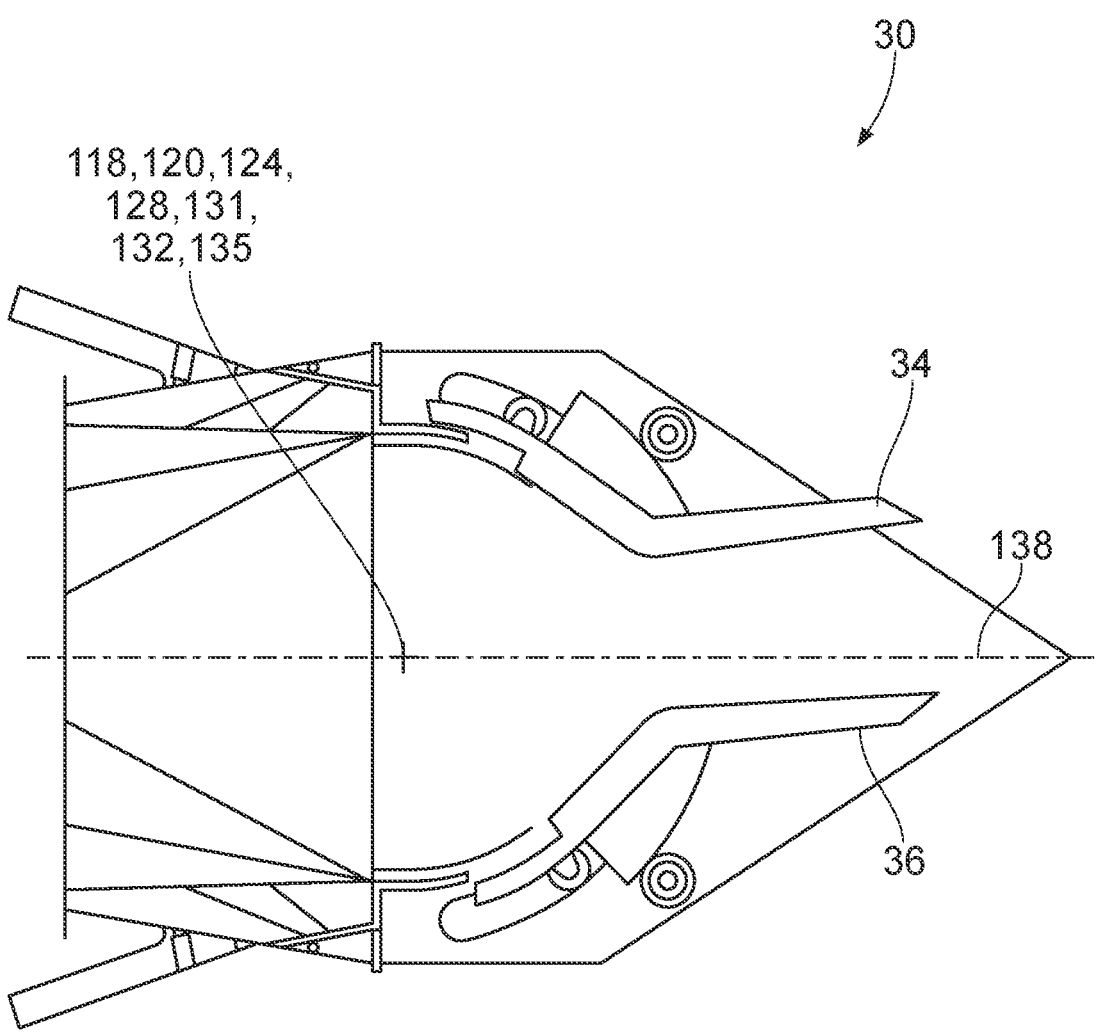
FIG. 10 is a cross-sectional side view of the exhaust nozzle in a sixth configuration.

FIG. 10 is a cross-sectional side view of the exhaust nozzle 30 in a sixth configuration. In the sixth configuration, the first flap 34 is positioned at an outer intermediate position between the first inner position and the first outer position and the second flap 36 is positioned at the second inner position.

Figure 11:
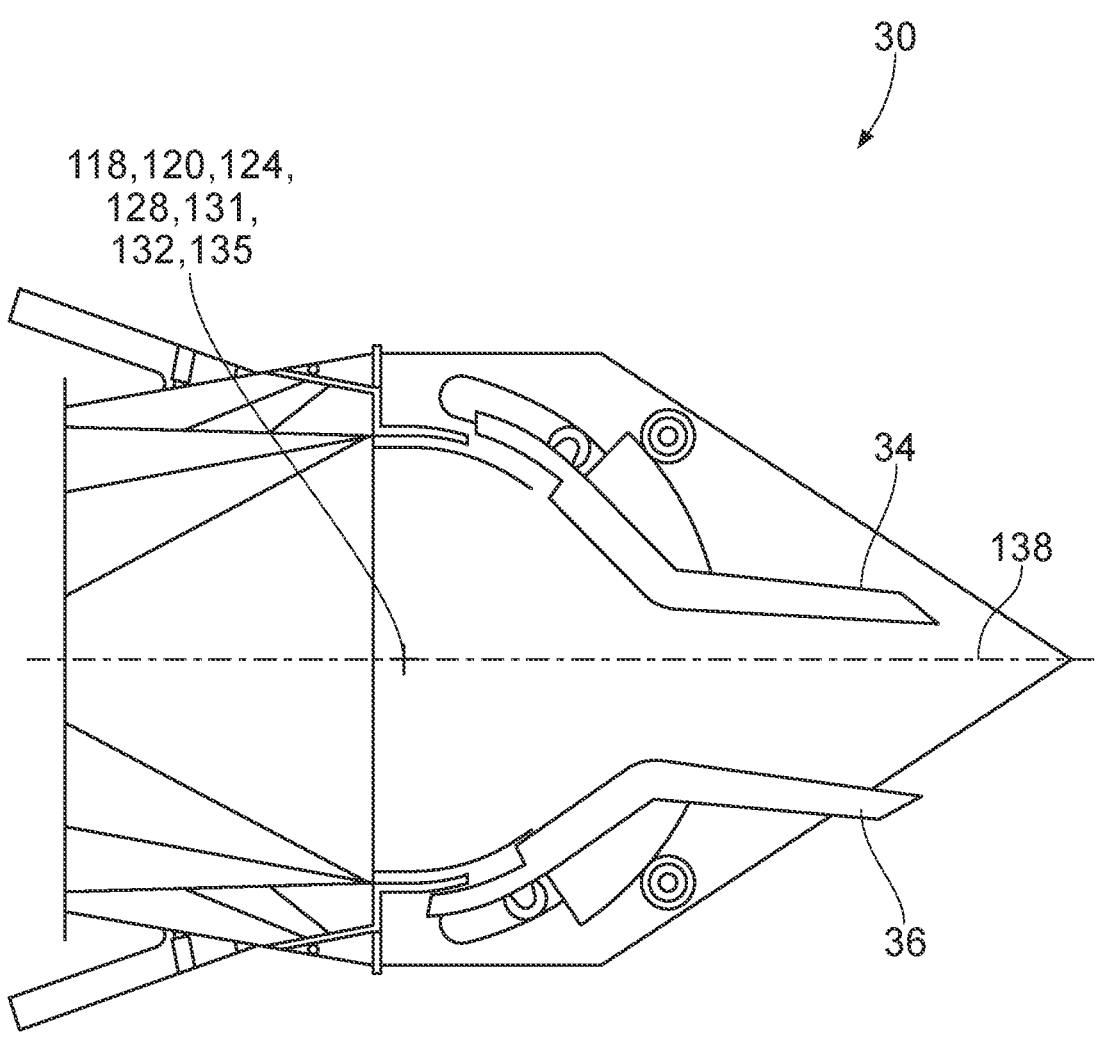
FIG. 11 is a cross-sectional side view of the exhaust nozzle in a seventh configuration.

FIG. 11 is a cross-sectional side view of the exhaust nozzle 30 in a seventh configuration. In the seventh configuration, the first flap 34 is positioned at the first inner position and the second flap 36 is positioned at an outer intermediate position between the second inner position and the second outer position.

In the first configuration shown in FIGS. 4 and 5, the first flap 34 is positioned at the outer intermediate position and the second flap 36 is positioned at the outer intermediate position.

FIG. 12 is a flowchart of a method 500 of operating the exhaust nozzle 30. The method 500 comprises a first step 502. In the first step 502, a controller 200 selects a vectoring mode of operation. Upon the vectoring mode of operation having been selected, the method 500 proceeds to a second step 504. In the second step 504, the controller 200 controls the first and second actuators 104, 106 to actuate the first and second flaps 34, 36 at the same rate of angular rotation in the same rotational direction about the first and second axes of rotation 118, 120. This results in thrust vectoring. Since the first and second flaps 34, 36 rotate about a common axis 118, 120, the geometry of the passageway 38 stays the same as the first and second flaps 34, 36 rotate (i.e. the exhaust nozzle 30 does not have variable geometry).

By way of example only, in the second step 504, the controller 200 can control the first and second actuators 104, 106 to actuate the first and second flaps 34, 36 from the fourth configuration (shown in FIG. 8) to the fifth configuration (shown in FIG. 9) or vice versa. By way of another example, in the second step 504, the controller 200 can control the first and second actuators 104, 106 to actuate the first and second flaps 34, 36 from the sixth configuration (shown in FIG. 10) to the seventh configuration (shown in FIG. 11) or vice versa.

Following the second step 504, a third step 506 is carried out. In the third step 506, the controller 200 selects a variable geometry mode of operation. Upon the variable geometry mode having been selected, the method 500 proceeds to the fourth step 508. In the fourth step 508, the controller 200 controls the first and second actuators 104, 106 to actuate the first and second flaps 34, 36 at a different rate of angular rotation and/or in different rotational directions about the first and second axes of rotation 118, 120. This modifies the geometry of the passageway 38 and thus changes the expansion ratio. The method 500 then proceeds back to the first step 502.

In the fourth step 508, the controller 200 can control the first and second actuators 104, 106 to actuate the first and second flaps 34, 36 at the same rate in opposite directions. This varies the geometry of the exhaust nozzle 30 without changing the direction of the centreline of the passageway 38 (and, thus, without carrying out thrust vectoring). By way of example only, in the fourth step 508, the controller 200 can control the first and second actuators 104, 106 to actuate the first and second flaps 34, 36 from the second configuration (shown in FIG. 6) to the third configuration (shown in FIG. 7) or vice versa.

Alternatively, in the fourth step 508, the controller 200 can control the first and second actuators 104, 106 to actuate the first and second flaps 34, 36 at different rates in different directions. This varies the geometry of the exhaust nozzle 30 while also changing the direction of the centreline of the passageway 38 (and, thus, also carrying out thrust vectoring). It will be appreciated that in the fourth step 508, one of the rates of rotation may be zero. By way of example only, in the fourth step 508, the controller 200 can control the first and second actuators 104, 106 to actuate the first and second flaps 34, 36 from the third configuration (shown in FIG. 7) to the sixth configuration (shown in FIG. 10) or vice versa.

Alternatively, in the fourth step 508, the controller 200 can control the first and second actuators 104, 106 to actuate the first and second flaps 34, 36 at different rates in the same direction. This varies the geometry of the exhaust nozzle 30 while also changing the direction of the centreline of the passageway 38 (and, thus, also carrying out thrust vectoring). It will be appreciated that in the fourth step 508, one of the rates of rotation may be zero. By way of example only, in the fourth step 508, the controller 200 can control the first and second actuators 104, 106 to actuate the first and second flaps 34, 36 from the third configuration (shown in FIG. 7) to the fifth configuration (shown in FIG. 9) or vice versa.

Although it has been described that the method 500 starts at the first step 502, it may instead start at the second, third or fourth steps 504, 506, 508. It will also be appreciated that the exhaust nozzle 30 may be configured to operate in only a single mode of operation (e.g. the vectoring mode of operation).

Figure 13:
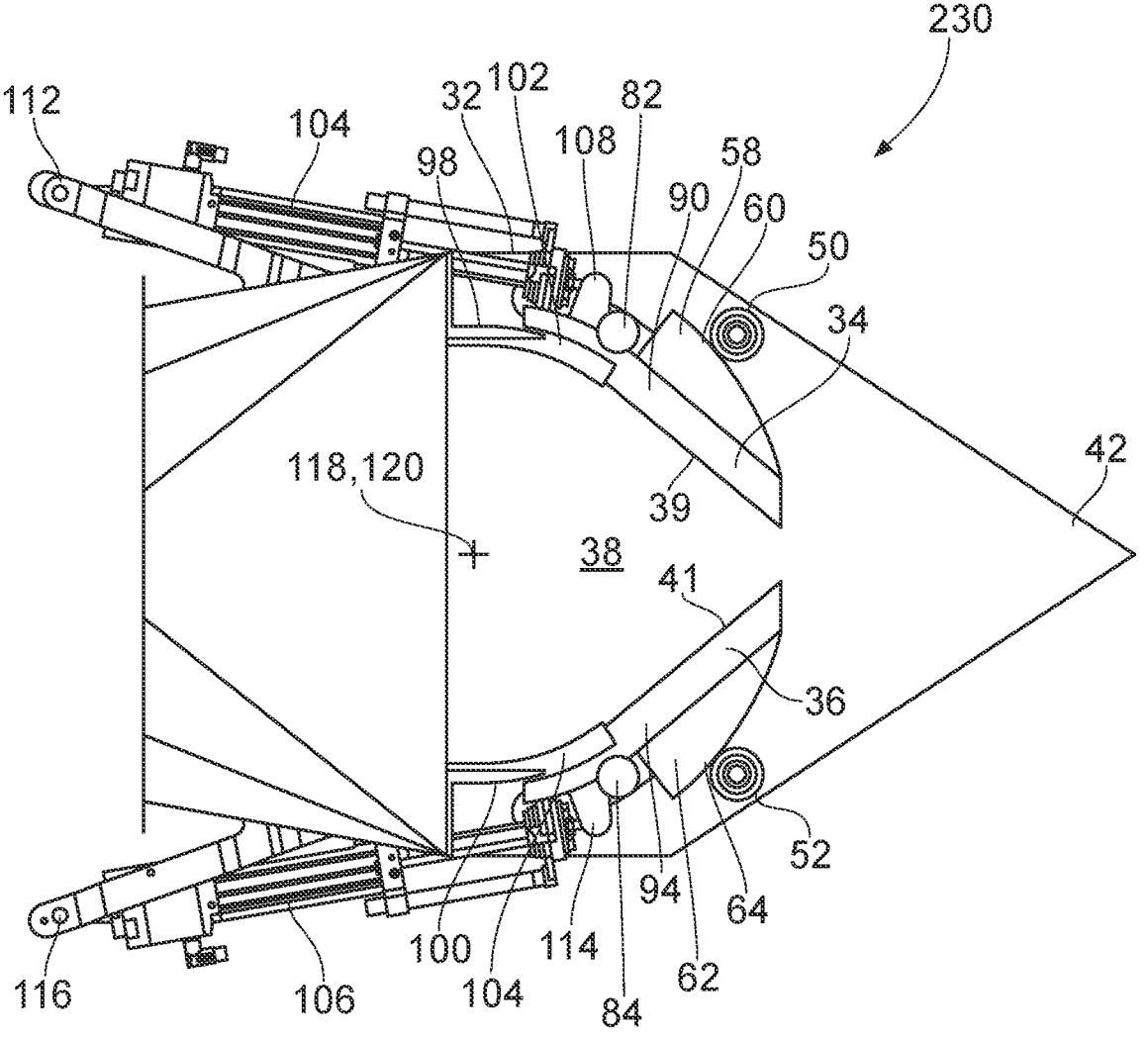
FIG. 13 is a cross-sectional side view of a first alternative exhaust nozzle.

FIG. 13 is a cross-sectional side view of a first alternative exhaust nozzle 230 in a first configuration. The first alternative exhaust nozzle 230 substantially corresponds to the exhaust nozzle 30 described previously and functions in a corresponding manner. However, the first flap 34 comprises a convergent portion 90 and does not comprise a divergent portion 92. Accordingly, the first flap 34 is a convergent flap. Likewise, the second flap 36 comprises a convergent portion 94 and does not comprise a divergent portion 96. Accordingly, the second flap 36 is a convergent flap. The first and second flaps 34, 36 of the first alternative exhaust nozzle 230 therefore define a convergent nozzle.

Figure 14:
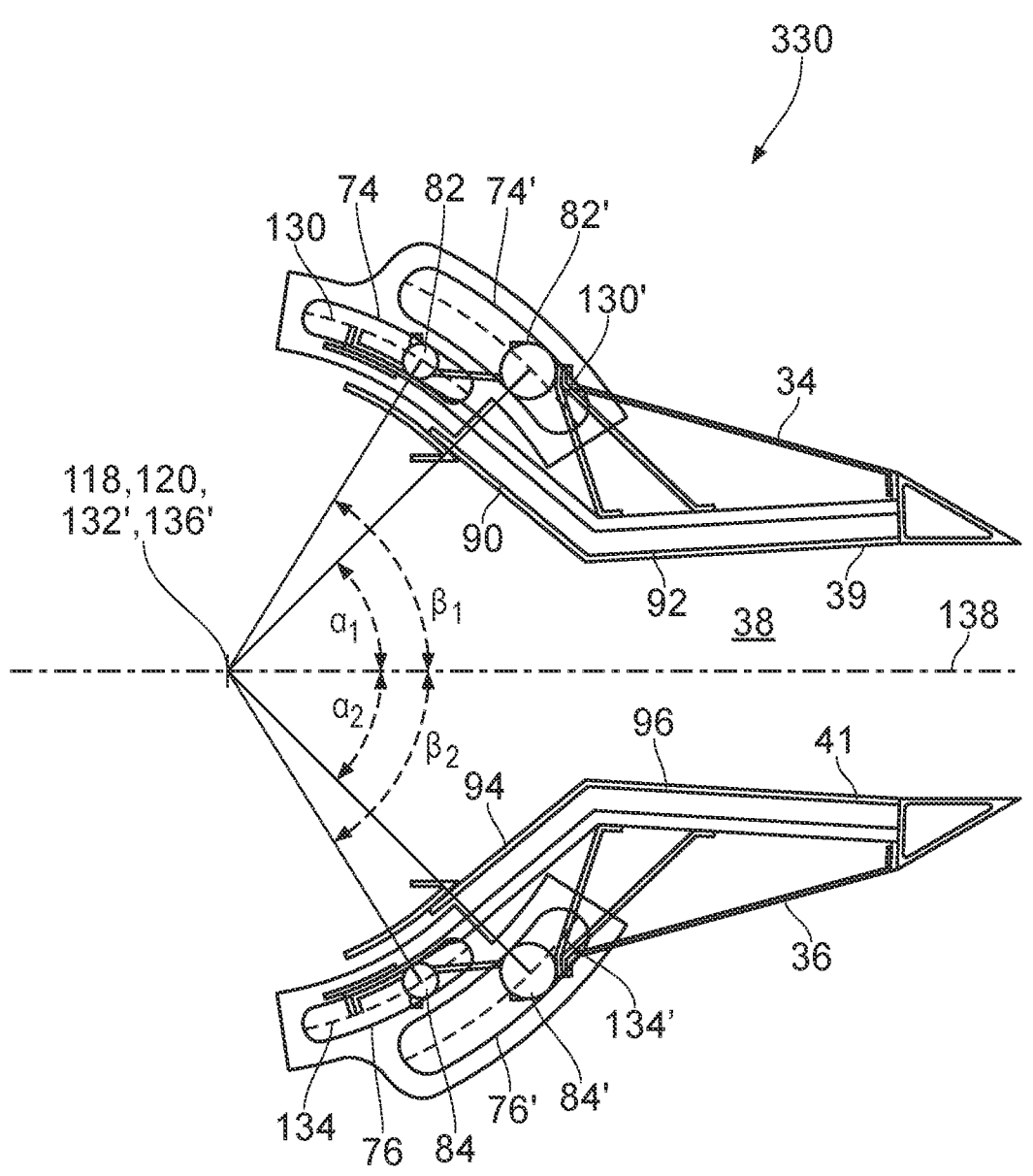
FIG. 14 is a cross-sectional side view of a second alternative exhaust nozzle.

FIG. 14 is a cross-sectional side view of a second alternative exhaust nozzle 330 in a first configuration. The second alternative exhaust nozzle 330 substantially corresponds to the exhaust nozzle 30 described previously and functions in a corresponding manner. However, instead of being provided with first and second rollers 50, 52, first and second cam tracks 58, 62 and first and second bearing surfaces 60, 64, the second alternative exhaust nozzle 330 is provided with a third slot 74', a third pin 82', a fourth slot 76' and a fourth pin 84'. The first flap 34 comprises the third pin 82' and the exhaust duct 32 comprises the third slot 74'. The third slot 74' is configured to slidably receive the third pin 82'. A centreline of the third slot 74' extends part way along a third arc 130' having a centre 132' that is coincident with the first and second axes of rotation 118, 120. The second flap 36 comprises a fourth pin 84' and the exhaust duct 32 comprises the fourth slot 76'. The fourth slot 76' is configured to slidably receive the fourth pin 84'. A centreline of the fourth slot 76' extends part way along a fourth arc 134' having a centre 136' that is coincident with the first and second axes of rotation 118, 120. The third slot 74' and the third pin 82' function in a corresponding manner to the first slot 74 and the first pin 82, respectively. The third and fourth slots 74', 76' and the third and fourth pins 82', 84' are disposed radially outward of the first and second slots 74, 76 and the first and second pins 82, 84 with respect to the first and second axes of rotation 118, 120.

The angle $\alpha_1$ between a central axis 138 of the exhaust nozzle 30 (which may be aligned with or parallel to the principal and rotational axis X-X) and a line extending through the first axis of rotation 118 and the third pin 82' is less than the angle $\beta_1$ between the central axis 138 and a line extending through the first axis of rotation 118 and the first pin 82. Accordingly, the first pin 82 and the third pin 82' are circumferentially separated with respect to the first axis of rotation 118. The angle $\alpha_2$ between the central axis 138 and a line 138 extending through the second axis of rotation 120 and the fourth pin 84' is less than the angle 32 between the central axis 138 and a line extending through the second axis of rotation 120 and the second pin 84. Accordingly, the second pin 84 and the fourth pin 84' are circumferentially separated with respect to the second axis of rotation 120. The line 138 may correspond to a centreline of the exhaust nozzle 30, which may be aligned with the principal and rotational axis X-X of the gas turbine engine 10. Corresponding features may be provided on the other side of the exhaust nozzle 30 to replace the third and fourth rollers, flanges and bearing surfaces.

In the foregoing description, it will be appreciated that the features not shown in the cross-sectional views are structurally similar and operate in a corresponding manner to those that are shown in the cross-sectional views.

In the foregoing description, the first flap is rotatably coupled to the exhaust duct 32 directly. However, it will be appreciated that the rotatable couplings between the first and second flaps and the exhaust duct 32 may instead be indirect rotatable couplings. That is, the first flap may be rotatably coupled to the exhaust duct 32 via intermediate components and the second flap may be rotatably coupled to the exhaust duct 32 via intermediate components.

What is claimed is:

1. An exhaust nozzle for a gas turbine engine, the exhaust nozzle comprising:

an exhaust duct configured to receive an exhaust flow of gas from a combustor of the gas turbine engine;

a first flap rotatably coupled to the exhaust duct for rotation about a first axis of rotation;

a first actuator configured to actuate the first flap about the first axis of rotation between a first inner position and a first outer position;

a second flap rotatably coupled to the exhaust duct for rotation about a second axis of rotation; and a second actuator configured to actuate the second flap about the second axis of rotation between a second inner position and a second outer position, wherein the first and second flaps at least in part define a passageway configured to convey the exhaust flow of gas to an exterior of the gas turbine engine, wherein the first and second axes of rotation are coaxial, wherein the first flap and the second flap are convergent-divergent flaps, wherein the first flap and the second flap define a rectangular nozzle, wherein the first flap is a single body with a convergent portion and a divergent portion, wherein the convergent portion of the first flap and the divergent portion of the first flap are fixed relative to each other, wherein the second flap is a single body with a convergent portion and a divergent portion, wherein the convergent portion of the second flap and the divergent portion of the second flap are fixed relative to each other, and wherein the exhaust nozzle further comprises a first roller rotatably coupled to the exhaust duct and the first flap comprises a first bearing surface that protrudes from an exterior surface of the convergent portion and is fixed with respect to the convergent portion in order to move together with the convergent portion and that is configured to bear against the first roller during rotational movement of the first flap about the first axis of rotation, wherein the first bearing surface forms part of a first cylindrical surface having a central axis that is coaxial with the first and second axes of rotation, and wherein the exhaust nozzle further comprises a second roller rotatably coupled to the exhaust duct and the second flap comprises a second bearing surface that protrudes from an exterior surface of the convergent portion and is fixed with respect to the convergent portion in order to move together with the convergent portion and that is configured to bear against the second roller during rotational movement of the second flap about the second axis of rotation, wherein the second bearing surface forms part of a second cylindrical surface having a central axis that is coaxial with the first and second axes of rotation.

2. The exhaust nozzle as claimed in claim 1, wherein a radius of the first cylindrical surface is equal to a radius of the second cylindrical surface.

3. The exhaust nozzle as claimed in claim 1, wherein the exhaust duct comprises a first side wall and a second side wall, wherein the exhaust nozzle further comprises a first shaft extending between the first side wall and the second side wall that rotatably supports the first roller, wherein the exhaust nozzle further comprises a second shaft extending between the first side wall and the second side wall that rotatably supports the second roller.

4. The exhaust nozzle as claimed in claim 1, wherein the first flap comprises a first pin and the exhaust duct comprises a first slot configured to slidably receive the first pin, wherein a centerline of the first slot extends part way along a first arc having a center that is coincident with the first and second axes of rotation, wherein the second flap comprises a second pin and the exhaust duct comprises a second slot configured to slidably receive the second pin, wherein a centerline of the second slot extends part way along a second arc having a center that is coincident with the first and second axes of rotation.

5. The exhaust nozzle as claimed in claim 4, wherein a radius of the first arc is equal to a radius of the second arc.

6. The exhaust nozzle as claimed in claim 4,
wherein the first pin and the first roller are circumferentially separated with respect to the first axis of rotation, wherein the second pin and the second roller are circumferentially separated with respect to the second axis of rotation.

7. The exhaust nozzle as claimed in claim 1, wherein the first flap comprises a third pin and the exhaust duct comprises a third slot configured to slidably receive the third pin, wherein a centerline of the third slot extends part way along a third arc having a center that is coincident with the first and second axes of rotation, wherein the second flap comprises a fourth pin and the exhaust duct comprises a fourth slot configured to slidably receive the fourth pin, wherein a centerline of the fourth slot extends part way along a fourth arc having a center that is coincident with the first and second axes of rotation, wherein the third and fourth slots and the third and fourth pins are disposed radially outward of the first and second slots and the first and second pins with respect to the first and second axes of rotation.

8. The exhaust nozzle as claimed in claim 1, wherein the first flap comprises a first control surface that in part defines the passageway, wherein the second flap comprises a second control surface that in part defines the passageway, wherein the first control surface and the second control surface are reflections of each other.

9. A system comprising the exhaust nozzle as claimed in claim 1 and a controller, wherein the controller is configured to, in a vectoring mode of operation, control the first and second actuators to actuate the first and second flaps at a same rate of angular rotation and in the same rotational direction about the first and second axes of rotation.

10. The system as claimed in claim 9, wherein the controller is configured to, in a variable geometry mode of operation, control the first and second actuators to actuate the first and second flaps at different rates of angular rotation and/or in different rotational directions about the first and second axes of rotation.

11. A gas turbine engine comprising the exhaust nozzle as claimed in claim 1 or comprising a system comprising the exhaust nozzle and a controller, wherein the controller is configured to, in a vectoring mode of operation, control the first and second actuators to actuate the first and second flaps at a same rate of angular rotation and in the same rotational direction about the first and second axes of rotation.

12. A method of operating the exhaust nozzle as claimed in claim 1, a system comprising the exhaust nozzle and a controller, wherein the controller is configured to, in a vectoring mode of operation, control the first and second actuators to actuate the first and second flaps at a same rate of angular rotation and in the same rotational direction about the first and second axes of rotation, or a gas turbine engine comprising the exhaust nozzle or the system, wherein the method comprises, in a vectoring mode of operation, controlling the first and second actuators to actuate the first and second flaps at a same rate of angular rotation and in the same rotational direction about the first and second axes of rotation.

13. The method as claimed in claim 12, wherein the method comprises, in a variable geometry mode of operation, controlling the first and second actuators to actuate the first and second flaps at different rates of angular rotation and/or in different rotational directions about the first and second axes of rotation.

* * * * *